United States Patent [19]

Hirose

[11] 4,071,861
[45] Jan. 31, 1978

[54] MAGNETIC RECORDING AND REPRODUCING SYSTEM

[75] Inventor: Huminori Hirose, Hirakata, Japan

[73] Assignee: Matsushita Electric Industrial Co., Ltd., Osaka, Japan

[21] Appl. No.: 698,919

[22] Filed: June 23, 1976

[30] Foreign Application Priority Data

June 24, 1975 Japan ............................ 50-78890
Oct. 13, 1975 Japan ............................ 50-123557

[51] Int. Cl.² ............... G11B 15/24; G11B 21/22; B65H 17/22
[52] U.S. Cl. ............................ 360/96; 226/176; 226/187; 360/105
[58] Field of Search ............... 360/90, 96, 105, 137; 226/176, 187

[56] References Cited

U.S. PATENT DOCUMENTS 3,770,176  11/1973  Hanzawa et al. ............... 226/176
3,809,827  5/1974  Oyaba ............................ 360/105

Primary Examiner—Robert S. Tupper
Attorney, Agent, or Firm—Stevens, Davis, Miller & Mosher

[57] ABSTRACT

A magnetic recording and reproducing system comprises a capstan, reel shafts, a motor for rotatably driving said capstan and said reel shafts, a magnetic tape wound up by the rotation of the reel shafts, a pinch roller for pressing the tape against the capstan, and a drive mechanism for driving said pinch roller into engagement with and disengagement from said capstan by a rotation force of said motor.

13 Claims, 18 Drawing Figures

MAGNETIC RECORDING AND REPRODUCING SYSTEM

The present invention relates to a magnetic recording and reproducing system.

In a prior art magnetic recording and reproducing system, recording/reproducing state, fast feed state and rewind state have been attained by selectively pressing an idler to reel shafts and a fly wheel or releasing the same by a manually operated button, or a transducing head and an erase head and a pinch roller have been moved by a control lever, or several solenoid plungers have been provided at the locations of the control buttons. Consequently, the prior art system has been very complex in structure and included a number of pivotable levers and sliders and hence it required a number of parts, which resulted in a large size and expensive system.

It is an object of the present invention to provide a magnetic recording and reproducing system which is simple in structure, requires less number of parts and movable parts, and is inexpensive and of small size.

In brief, in the magnetic recording and reproducing system of the present invention, a capstan and reel shafts are driven by a motor, the rotation force of which also selectively move a pinch roller to record/reproduce position or stop position.

Further features and advantages of the present invention will be apparent from the following description taken in conjunction with the accompanying drawings:

Figure 1:
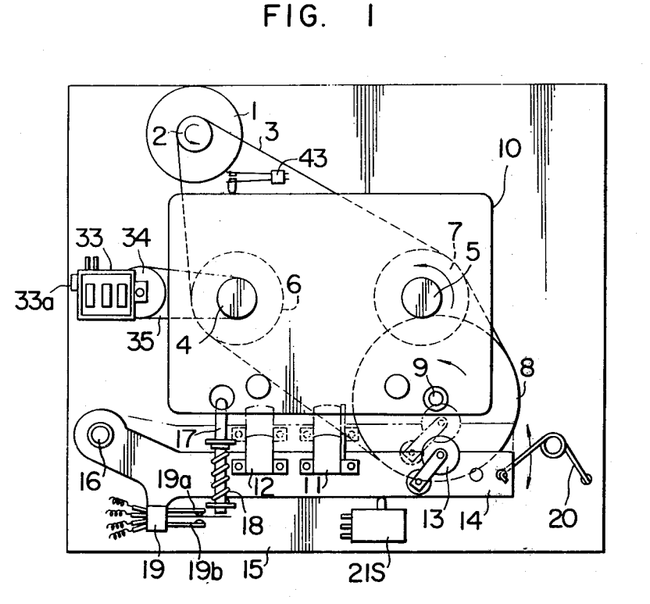
FIG. 1 shows a construction of a first embodiment of a magnetic recording and reproducing system of the present invention.
Figure 2:
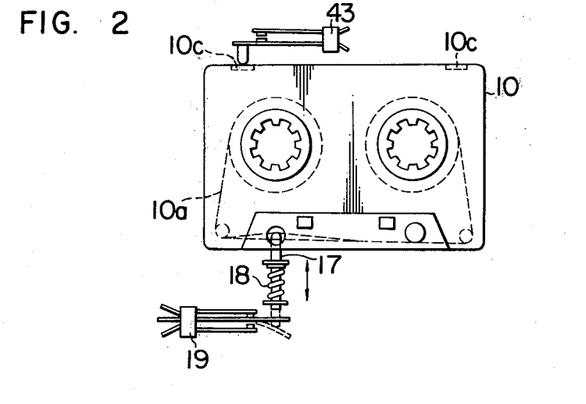
FIG. 2 illustrates a cartridge therefor.

Referring to FIG. 1, a belt 3 spans around a pulley 2 of a motor 1 which can perform fast and slow forward rotation and fast reverse rotation. The belt also spans around reel shaft pulleys 6 and 7 of two reel shafts 4 and 5 and a fly wheel 8. Thus, whenever the motor 1 rotates, the reel shaft pulleys 6 and 7, the fly wheel 8 and the capstan 9 rotates. A cartridge 10 which accommodates a multi-track magnetic tape is mounted on the reel shafts 4 and 5. A magnetic transducing head 11, an erase head 12 and a pinch roller 13 are mounted on a head mounting base 14 to allow their engagement and disengagement relative to the magnetic tape (not shown) of the cartridge 10 for establishing recording/reproducing state and stop state. The head mounting base 14 pivots around a pivot pin 16 fixed to a chassis 15 to move the magnetic transducing head 11, the erase head 12 and the pinch roller 13 to the position shown by a dotted line. As shown in FIG. 2, a magnetic tape end sensing pin 17 senses when the magnetic tape 10a of the cartridge 10 has been fully wound on one of the reels, to overcome a force of a return spring 18 by the tension of the magnetic tape 10a for inverting a tape end sensing switch 19. Referring again to FIG. 1, the head mounting base 14 is permitted to pivot over a predetermined angle and a toggle spring 20 having one end fixed to the chassis 15 cooperates with one end of the base 14 to impart snap function to the pivotal movement. A fast-slow selection switch 21S is operated by the head mounting base 14 to turn on or off for selecting fast or slow rotation of the motor 1.

Figure 3:
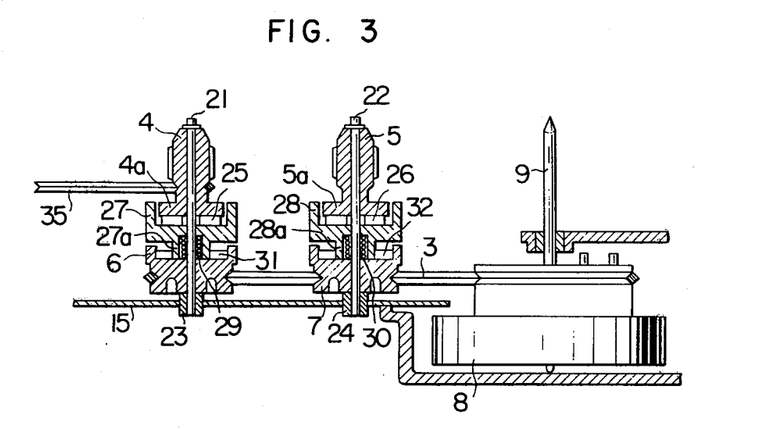
FIG. 3 is a sectional view of reel receiving shafts.

The reel shafts 4 and 5 are constructed as shown in a sectional view of FIG. 3. Center shafts 21 and 22 are fixed to the chassis 15 by bosses 23 and 24, and the reel shafts 4 and 5 are rotatably supported by the center shafts 21 and 22. Flanges 4a and 5a of the reel shafts 4 and 5 abut against pad 25 and 26 to which reel mounts 27 and 28 are pressed by springs 29 and 30. In this manner, the reel mounts 27 and 28 and the pads 25 and 26 form slip clutches, respectively, which slip when a given torque is applied. The slip clutches operate when the magnetic tape 10a of the cartridge 10 shown in FIG. 2 has been fully wound in one direction and one end thereof appears, to thereby prevent the breakage of the magnetic tape 10a.

Figure 4:
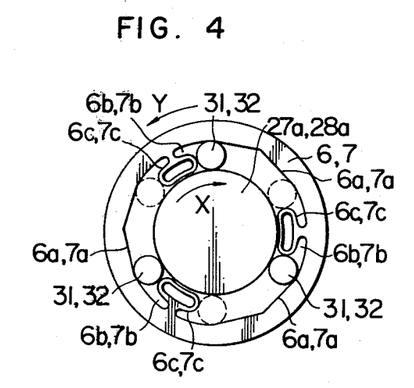
FIGS. 4 and 5 show further details of portions of FIG. 3.
Figure 5:
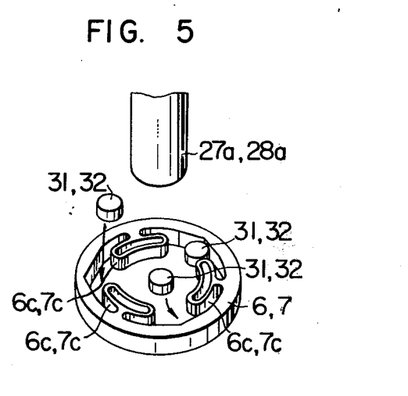

Referring again to FIG. 3, reduced diameter portions 27a and 28a of the reel mounts 27 and 28 together with cylindrical rollers 31 and 32 forms one-way clutches, respectively, inside the reel pulley 6 and 7. The construction of the one-way clutches is shown in FIGS. 4 and 5. Several cylindrical rollers 31 and 32 are mounted between the reduced diameter portions 27a and 28a of the reel mounts 27 and 28, and the reel pulleys 6 and 7, and straight sides 6a and 7a are formed inside the reel pulleys 6 and 7 such that the separations between the reel pulleys 6 and 7 and the reduced diameter portions 27a and 28a of the reel mounts 27 and 28, respectively, are smaller than the diameters of the cylindrical rollers 31 and 32. Gaps 6b and 7b which are larger than the diameters of the cylindrical rollers 31 and 32 are also formed. Resilient members 6c and 7c are integrally formed on the reel pulleys 6 and 7 to urge the cylindrical rollers 31 and 32 toward smaller gap areas to press them to the straight sides 6a and 7a. When the reduced diameter portions 27a and 28a of the reel mounts 27 and 28 are rotated in the direction of an arrow X, the cylindrical rollers 31 and 32 bite the reduced diameter portions 27a and 28a of the reel mounts and the straight sides 6a and 7a of the reel pulley 6 and 7 so that the reduced diameter portions 27a and 28a of the reel mounts 27 and 28, the reel pulleys 6 and 7 and the cylindrical rollers 31 and 32 rotate in combination. The same result is obtained when the reel pulleys 6 and 7 are rotated in the direction of an arrow Y. When the reduced diameter portions 27a and 28a of the reel mounts are rotated in the opposite direction to the arrow X, the cylindrical rollers 31 and 32 overcome the resilient forces of the resilient members 6c and 7c to move into the larger gaps 6b and 7b where they idle and transmit no rotational force. In this manner, one-way clutches are provided. When it is desired to reverse the direction of rotation limitation of the one-way clutches, the cylindrical rollers 31 and 32 may be positioned at the locations indicated by dotted circles. In this way, by merely exchanging the locations of the cylindrical rollers 31 and 32 during the assembling step, the direction of rotation limitation can be changed. In the illustrated embodiment, the belt 3 spans around the two pulleys 6 and 7. By establishing the direction of the rotation limitation of the one-way clutches such that the reel shaft 5 stops (or idles) when the reel shaft 4 rotates while the reel shaft 4 stops (or idles) when the reel shaft 5 rotates, the rotations of the reel shafts 4 and 5 can be changed by the forward and reverse rotation directions of the motor 1. For example, in a cassette deck, when the motor 1 is rotated counterclockwise to convey the rotational force of the motor 1 to the reel shaft 5 in FIG. 1, the capstan 9 and the reel shaft 5 are rotated counterclockwise to attain the recording/reproducing state and the fast feeding state. At this time, no rotational force is transmitted to the reel shaft 4, which is rotated counterclockwise by the tension of the magnetic tape 10a (FIG. 2). When the motor 1 is reversed to rotate clockwise, the rotational force of the motor 1 is transmitted to the reel shaft 4 to rotate the same clockwise, and the reel shaft 5 is rotated clockwise by the tension of the magnetic tape 10a. At this time, the capstan 9 also rotates clockwise.

Figure 6:
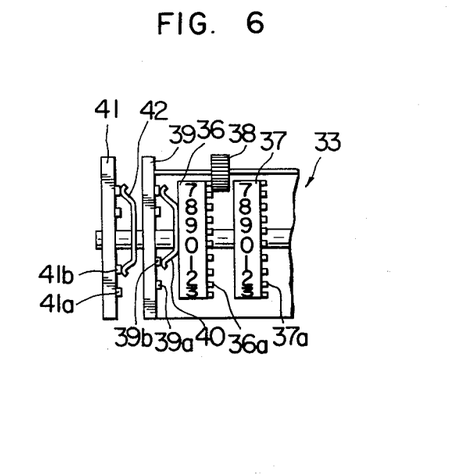
FIG. 6 shows a construction of a counter in FIG. 1.
Figure 7A:
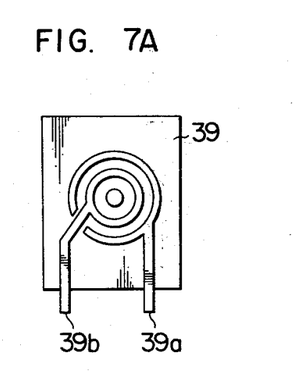
FIGS. 7A and 7B show constructions of a counter switch.
Figure 7B:
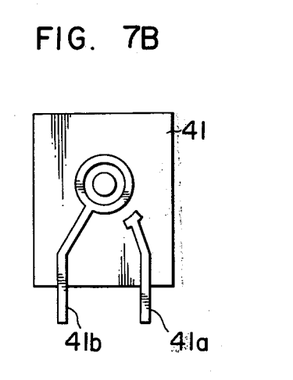

The rotation of the reel shaft 4 is transmitted to a pulley 34 of a counter 33 through a belt 35. The counter 33 includes counter indication wheels 36 and 37 which are equal in number to the number of digits of indication, as shown in FIG. 6. The counter indication wheels 36 and 37 carry counter gears 36a and 37a, and the indication wheel 36 rotates one tenths of a revolution for each full revolution of the indication wheel 37 by the function of a feed gear 38. Since the counter has three digits in the illustrated embodiment, it indicate the numbers from 0 to 999 and then changes to 0. Formed on a side 39 of the counter 33 are contacts 39a and 39b, as shown in FIG. 7A, to which a contact spring (counter switch) 40 contacts to form a normally close switch, which is opened between the contacts 39a and 39b when the content of the counter 33 reaches 0. Also formed on a side 41 of the counter 33 are contacts 41a and 41b, as shown in FIG. 7B, to which a contact spring (counter switch) 42 contacts to form a normally open switch, which is closed between the contacts 41a and 41b when the content of the counter 33 reaches 0. Referring again to FIG. 1, a record protection switch 43 is provided in association with the cartridge 10. The cartridge 10 include record protection tabs 10b and 10c as shown in FIG. 2, and the record protection switch 43 is turned on or off depending on the presence or absence of the tabs 10b and 10c.

Figures 8, 9, 10:
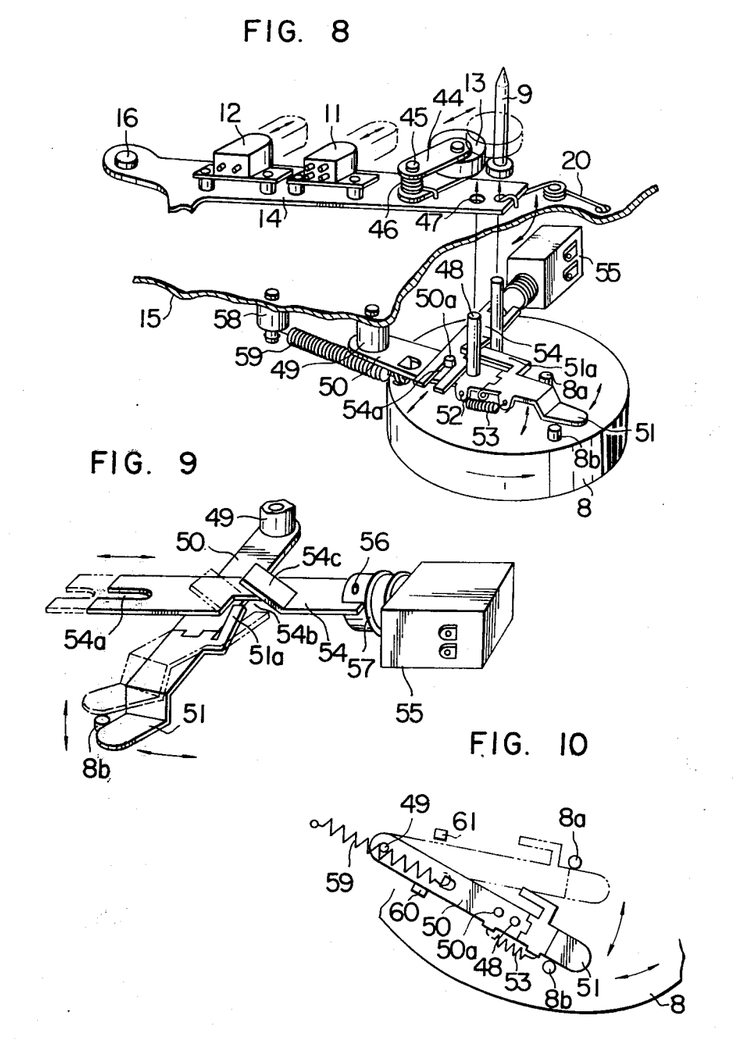
FIG. 8 is a perspective view of a major portion of the system of FIG. 1.
FIGS. 9 and 10 illustrate the operation of FIG. 8.

Now, referring to FIGS. 1, 8, 9 and 10, the operation of the magnetic transducing head 11, the erase head 12 and the pinch roller 13 is explained. As shown in FIG. 8, the pinch roller 13 is rotatably supported by a support lever 44 which is pivotable around a pivot 45 and biased by a spring 46. A hole 47 is formed in the head mounting base 14, which is moved by a pin 48 extending through the hole 47. The fly wheel 8 is provided with drive pins 8a and 8b. A switch lever 50 is pivotably mounted on a pivot pin 49 formed on the chassis 15, and an elevation lever 51 is vertically pivotably supported by a hinge 52 at an end of the lever 50. The switch lever 50 and the elevation lever 51 are loaded by a spring 53 so that the elevation lever 51 is normally biased downward. The elevation lever 51 is provided with a raised portion 51a which abuts against a slide lever 54 to prevent the elevation lever 51 from moving downward. A slide pin 50a fixed to the switch lever 50 engages a cutout 54a formed in the slide lever 54, which in turn is linked to a solenoid plunger 55 by a pin 56 such that when the solenoid plunger 55 is energized the slide lever 54 is pulled rightward in FIG. 9 to cause the raised portion 51a of the elevation lever 51 to enter the cutout 54b of the slide lever 54 to lower the elevation lever 51. When the solenoid plunger 55 is deenergized, the slide lever 54 is moved leftward in FIG. 9 by the spring 57 and the raised portion 51a of the elevation lever 51 is lowered by a ramp 54c of the slide lever 54 for directing the end of the elevation lever 51 upward. In this case, as the elevation lever 51 is lowered, it abuts against the drive pins 8a and 8b of the fly wheel 8. The switch lever 50 pivots around the pivot pin 49 by a spring 59 having one end thereof attached to a support pin 58 fixed to the chassis 15. Thus, as shown in FIG. 10, the switch lever 50 moves between the stops 60 and 61 of the chassis 15.

When the solenoid plunger 55 is energized to move the slide lever 54 rightward, the raised portion 51a of the elevation lever 51 enters the cutout 54b to lower the end of the elevation lever 51, which in turn abuts against the drive pin 8b of the fly wheel 8. Since the drive pin 8b is rotated with the rotation of the fly wheel 8, the elevation lever 51 cooperates with the switch lever 50 to overcome the action of the spring 59 and moves to the position of a dotted line shown in FIG. 10. The switch lever 50 has the switch pin 48 fixed for allowing the pivotal movement of the head mounting base 14, which is then moved to cause the magnetic transducing head 11, the erase head 12 and the pinch roller 13 to contact to the magnetic tape 10a of the cartridge 10 for establishing the recording/reproducing state. Since the solenoid plunger 55 is energized for a short period, the slide lever 54 is pushed back by the spring 57 and the end of the elevation lever 51 is raised by the ramp 54c and does not abut against the drive pins 8a and 8b of the fly wheel 8. Therefore, the magnetic transducing head 11 remains in the recording/reproducing position. Next, when the solenoid plunger 55 is again energized, the end of the elevation lever 51 is lowered in a similar manner and the elevation lever 51 abuts against the drive pin 8a of the fly wheel 8 so that the switch lever 50 is pivoted toward the solid line position in FIG. 10. At the same time, the switch pin 48 pivot the head mounting base 14 to position the magnetic transducing head 11, the erase head 12 and the pinch roller 13 to the stop position. In this manner, each time the solenoid plunger 55 is energized, the recording/reproducing state and the stop state are alternately established.

Figure 11:
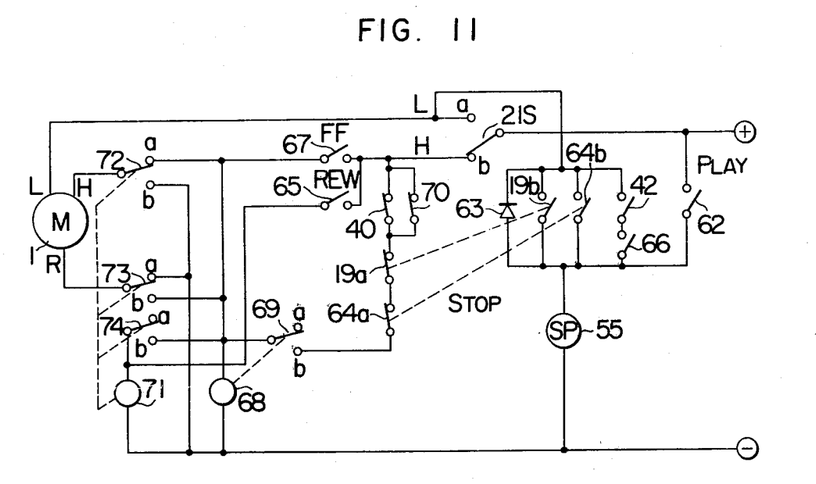
FIG. 11 shows a circuit diagram of a control circuit of the system of FIG. 1.

Referring to a circuit diagram of a control circuit shown in FIG. 11, the operation thereof is now explained. When a play button not shown is depressed, a play switch 62 is turned on instantly to energize the solenoid plunger 55, which results in downward movement of the elevation lever 51 as described above. When the head mounting base 14 is in the stop position, the fast-slow selection switch 21S is connected to the contact b (fast). As the play switch 62 is turned on, a current flows through a diode 63 to a slow terminal L of the motor 1 so that the motor 1 is switched to the slow rotation. The fly wheel 8 is rotated by the rotation of the motor 1, and the elevation lever 51 abuts against the drive pin 8b to pivot the head mounting base 14, which in turn press the magnetic transducing head 11, the erase head 12 and the pinch roller 13 against the magnetic tape 10a to establish the recording/reproducing state. As a result, the fast-slow switch 21S is switched to the contact a and a voltage is supplied to the slow terminal L of the motor 1 to maintain the recording/reproducing state.

When a stop button not shown is depressed, a stop switch 64b is turned on instantly to energize the solenoid plunger 55. As a result, the elevation lever 51 is moved downward to abut against the drive pin 8a of the fly wheel 8, to pivot the head mounting base 14 for establishing the stop state. Consequently, the fast-slow selection switch 21S is switched to the contact b and the motor 1 is stopped. When the end of the magnetic tape 10a appears while the stop switch 64b is not turned on, a tape end sensing switch 19b is turned on so that the recording/reproducing state is changed to the stop state as in the case of the depression of the stop button. Furthermore, in the recording/reproducing state, by turning the play switch 62 again on, the stop state is established.

A play memory operation is now described. Before a rewind operation, a reset button 33a of the counter 33 (FIG. 1) is depressed to reset the counter indication to 000 and then the rewind switch 65 is turned on to rewind the tape by a certain amount. Then, a play memory switch 66 is turned on and playback or recording operation is conducted in the recording/reproducing state. In this case, when the content of the counter 33 reaches 000, a counter switch 42 is turned on and the solenoid plunger 55 is actuated in the same manner as in the case of turn-on of the stop switch 65b, for changing the recording/reproducing state to the stop state.

A fast feed operation is as follows. In the stop state, the fast-slow selection switch 21S is connected to the contact b (fast). Thus, when a fast feed button (not shown) is depressed to turn on a fast feed switch 67 instantly, a positive voltage is applied to a fast terminal H of the motor 1 so that the motor 1 rotates at high speed counterclockwise in FIG. 1 to rotate the reel shaft 5 and the capstan 9 counterclockwise. At the same time, a relay 68 is energized and a contact 69 of the relay 68 is thrown to a contact b so that the relay 68 holds itself. Connected in series to this selfhold circuit are a normally close switch 64a which is linked to the stop switch 64b, the tape end sensing switch 19a and the counter switch 40. Thus, by turning on the fast feed switch 67 once, the fast feed state is maintained. When a stop button is depressed to turn off the switch 64a, when the tape end sensing switch 19a is turned off, or when the content of the counter reaches 000 and the counter switch 40 is turned off, the selfhold of the relay 68 is released and the motor 1 stops. A switch 70 connected in parallel with the counter switch 40 is a fast or rewind memory switch, which is turned off for the memory operation so that the selfhold of the relay 68 is released by the counter switch 40 to stop the motor 1.

A rewind operation is described below. When a rewind button (not shown) is depressed to turn on a rewind switch instantly, a relay 71 is energized and contacts 72, 73 and 74 thereof are thrown to the contacts b. A voltage is applied through the contact 74 to a relay 68, which holds itself as in the case of the fast feed. Consequently, since a positive voltage is applied to a reverse terminal R of the motor 1 through the contacts 69 and 73 and a negative voltage is applied to the fast terminal H through the contact 72, the motor 1 rotates at high speed in the reverse direction, that is, clockwise in FIG. 1, to rotate the reel shaft 4 clockwise for rewind. The release of the rewind state is performed in the same manner as the release of the fast feed state.

Figure 12:
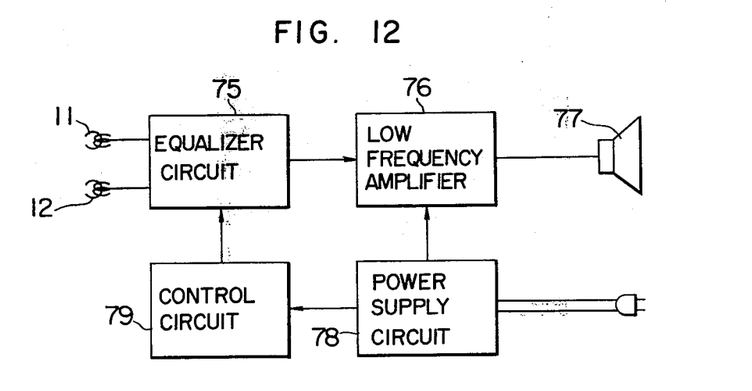
FIG. 12 is a block diagram of an overall circuit of the system of FIG. 1.
Figure 13:
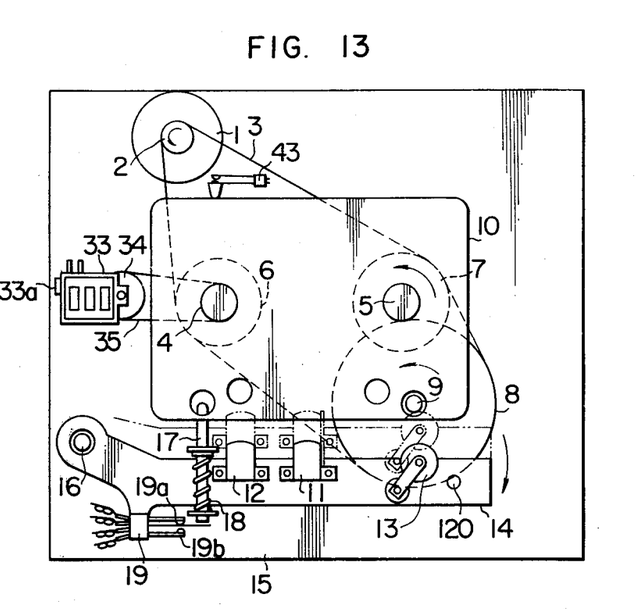
FIG. 13 shows a construction of a second embodiment of the magnetic recording and reproducing system of the present invention.

FIG. 12 shows an overall block diagram of the magnetic recording and reproducing system of FIG. 1. The magnetic transducing head 11 and the erase head 12 are connected to an equalizer circuit 75 an output signal of which is amplified by a low frequency amplifier circuit 76 and fed to a speaker. The equalizer 75 and the low frequency amplifier circuit 76 are powered by a power supply circuit 78. A control circuit 79 for performing the recording/reproducing, stop, fast feed and rewind operations is also powered by the power supply circuit 78. A particular circuit of the control circuit 79 is shown in FIG. 11.

According to the present embodiment, since the pinch roller 13 is engaged with or disengaged from the capstan 9 by transmitting the rotational force of the motor 1 to the head mounting base 14 by the control of the solenoid plunger 55, the construction is simplified. Furthermore, since the magnetic transducing head 11 and the erase head 12 are moved with the pinch roller 13, the construction is further simplified. It should be understood that the magnetic transducer head 11 and the erase head 12 may be moved separately from the pinch roller 13.

FIGS. 13 to 17 show a second embodiment of the magnetic recording and reproducing system of the present invention. In this embodiment those parts having the same reference numerals as in the first embodiment represent like elements and hence they are not explained here. The difference of the second embodiment from the first embodiment lies in a drive mechanism for removably driving the pinch roller 13 into engagement with and bringing the same into disengagement from the capstan 9 by the rotation of the motor 1. The drive mechanism is now explained in conjunction with peripheral mechanisms.

Figure 14:
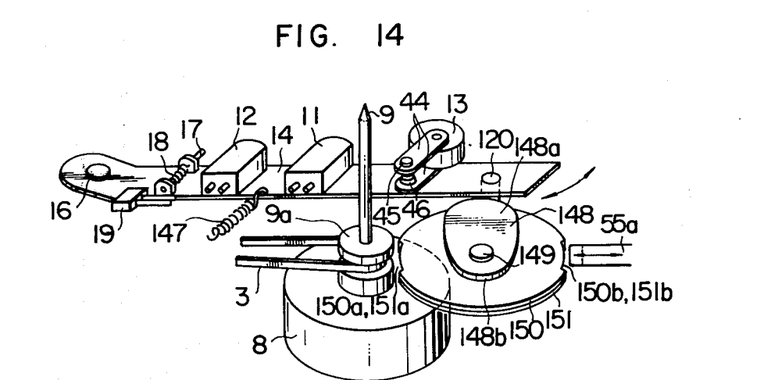
FIGS. 14 and 15 show perspective views of major portions of the system of FIG. 13.

In the drawings, the pinch roller 13 is rotatably supported by a support lever 44, as shown in FIG. 14, which pivots around a pivot point 45 and is loaded by a spring 46. A tension spring 147 is attached to the head mounting base 14, and a pin 120 provided at the end of the head mounting base 14 is abutted against a rotary cam plate 148 by the tension spring 147. The rotary cam plate 148 is formed with a curved surface 148a of a large diameter, which pivots the head mounting base 14 when the curved surface 148a abuts against the pin 120 to, move the magnetic transducing head 11, the erase head 12 and the pinch roller 13 to the recording/reproducing position. The rotary cam plate 148 is also provided with a curved surface 148b of a small diameter, which pivots the head mounting base 14 when the curved surface 148b abuts against the pin 120, to move the magnetic transducing head 11, the erase head 12 and the pinch roller 13 to the fast feed, rewind and stop positions. A cam shaft 149 is fixed to the rotary cam plate 148. A disc 150 having cutouts 150a and 150b and a movable disc 151 having cutouts 151a and 151b are attached to the cam shaft 149. Pins 152a and 152b formed on the cutout disc 150 fit into slots 153a and 153b formed in the movable cutout disc 151. Opposite ends of a pressurizing torque spring 155 are inserted in a bore 154a formed in the cutout disc 150 and in a bore 154b formed in the movable cutout disc 151. The pressurizing torque spring 155 serves to impart a drive force for rotating the discs 150 and 151 in a given rotation direction. The cutout disc 150 and the movable cutout disc 151 are rotatably driven when the outer peripheries thereof engage a rubber roll 9a attached to the fly wheel 8 which is mounted on the capstan 9. When the cutouts 150a and 150b, and the cutouts 151a and 151b formed in the peripheries of the discs 150 and 151 face the rubber roll 9a, the rotation thereof is stopped. The periphery of the movable cutout disc 151 is also formed with cutout ramps 151c which are slightly inward of the fronts of the cutouts 151a and 151b with respect to the direction of rotation. The cutouts 150a and 150b of the cutout disc 150 and the cutouts 151a and 151b of the movable cutout disc 151 are adapted to be engaged by a plunger pawl 55a of the solenoid plunger 55 which is energized by a spring 156.

A detent cam plate 158 is fixed to the cam shaft 149, and cutouts 158a and 158b formed in the periphery of the detent cam plate 158 are adapted to be engaged by a detent roller 161 rotatably supported by a leaf spring 160 attached to a support 159. The rotary switch 21S is mounted on the cam shaft 149 to switch the motor 1 between the fast rotation and the slow rotation. When the solenoid plunger 55 is energized, the plunger pawl 55a is pulled rightward in FIG. 15 to release the engagement of the cutouts 150a and 151a or the cutouts 150b and 151b of the cutout disc 150 and the movable cutout disc 151. At this time, the movable cutout disc 151 is pivoted clockwise by the biasing force of the pressurizing torque spring 155 to engage the rubber roller 9a, which further pivots the disc 151 clockwise. As the fly wheel 8 driven by the motor 1 rotates, the cutout disc 158 fixed to the cam shaft 149, the movable cutout disc 151, the rotary cam plate 148 and the detent cam plate 158 are pivoted clockwise to press a large diameter portion 148a of the rotary cam plate 148 against the pin 120. Consequently, the magnetic transducing head 11 and the erase head 12 mounted on the head mounting base 14 contact with the magnetic tape and the pinch roller 13 contacts with the capstan 9 with the magnetic tape being interleaved therebetween, for establishing the recording/reproducing state. Under this condition, the solenoid plunger 55 is energized for a short time and the cutouts 150b and 151b or the cutouts 150a and 151b of the cutout disc 150 and the movable cutout disc 151 are positioned to the rubber roll 9a and the detent roller 161 engages the detent cam plate 158. In this manner the recording/reproducing state is maintained and the system is ready for a subsequent operation of the solenoid plunger 55.

Figure 15:
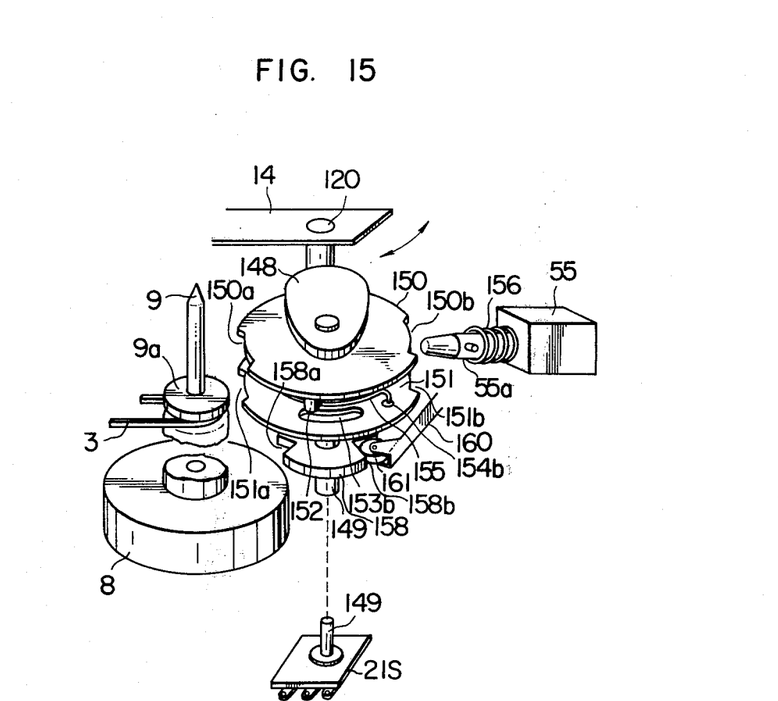
Figure 16:
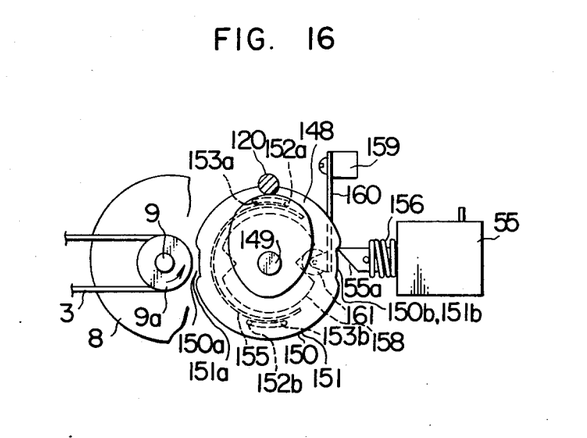
FIGS. 16 and 17 illustrate the operation thereof.
Figure 17:
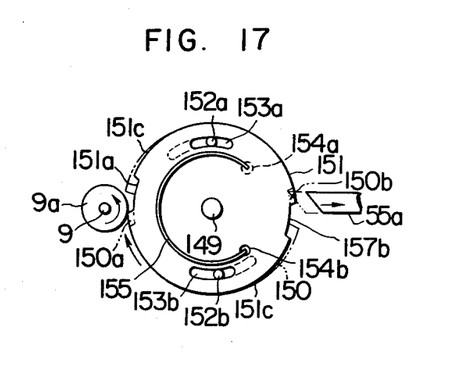

When the solenoid plunger 55 is again energized, the rotary cam plate 148 fixed to the cam shaft 149 is rotated clockwise in a similar operation to release the engagement of the large diameter portion 148a and the pin 120. Consequently, the magnetic transducing head 11, the erase head 12 and the pinch roller 13 mounted on the head mounting base 14 are disengaged from the tape and positioned to the stop, fast feed and rewind positions. In this manner, each time the solenoid plunger 55 is energized, the recording/reproducing state and the fast feed, rewind and stop state are alternately switched.

According to the present embodiment, since the pinch rubber 13 is driven into engagement with or disengagement from the capstan 9 by transmitting the rotational force of the motor 1 to the head mounting base 14 by the control of the solenoid plunger 57, the construction is simplified. Furthermore, since the magnetic transducing head 11 and the erase head 12 are moved with the pinch roller 13, the construction is further simplified. It should be understood that the magnetic transducing head 11 and the erase head 12 may be moved separately from the pinch roller 13.

As described hereinabove, since the magnetic recording and reproducing system of the present invention can establish the recording/reproducing state by a simple electrical switching operation, the construction is simplified, the number of parts and the movable parts can be reduced, and size reduction and cost reduction are attained. Furthermore, since the manipulation is simple, it is applicable to a remote control apparatus. Because less number of control levers and idlers are included, the operation is stable and wow-flatter is not included. Furthermore the flexibility of design increases because the control section can be arranged at any desired position in the recording and reproducing system.

What is claimed is:

1. A magnetic recording and reproducing system comprising a capstan, reel shafts, motor means operative when connected to a voltage source, coupling means for transmitting the rotational force of said motor to said capstan and reel shafts, a pinch roller for pressing a magnetic tape to said capstan, an engagement-disengagement drive mechanism responsive to said coupling means for selectively driving said pinch roller into engagement with and disengagement from said capstan, an electromagnetic plunger operative when connected to a voltage source to cause an initial motion of said engagement-disengagement drive mechanism which serves to couple said coupling means to said engagement-disengagement drive mechanism, and operation switch means for connecting said electromagnetic plunger and said motor to a voltage source, said electromagnetic plunger and engagement-disengagement drive mechanism arranged such that a first operation of said electromagnetic plunger serves to couple said engagement-disengagement drive mechanism to said coupling means to drive said pinch roller into engagement with said capstan and a second operation of said electromagnetic plunger serves to couple said engagement-disengagement drive mechanism to said coupling means to disengage said pinch roller from said capstan.

2. A magnetic recording and reproducing system according to claim 1 further including a magnetic transducing head mechanically coupled to said pinch roller which moves into engagement with and disengagement from said magnetic tape in response to the engagement and disengagement of said pinch roller and said capstan.

3. A magnetic recording and reproducing system according to claim 1 further including a selection switch responsive to movement of said pinch roller for switching said motor between a slow rotation mode and a fast rotation mode in response to the engagement and disengagement of said pinch roller.

4. A magnetic recording and reproducing system according to claim 1 further including a selection switch responsive to movement of said pinch roller and containing a slow contact and a fast contact for switching said motor between a fast rotation mode and a slow rotation mode and for feeding voltage to said electromagnetic plunger through said slow contact.

5. A magnetic recording and reproducing system according to claim 1 further including a selection switch responsive to movement of said pinch roller and containing slow and fast contacts which are coupled, respectively, to slow and fast inputs of said motor for switching said motor between a slow rotation mode and a fast rotation mode in response to the engagement and disengagement of said pinch roller, a fast feed switch and a rewind switch inserted in a circuit of a fast contact of said selection switch, and a magnetic tape end sensing switch for coupling a voltage to said electromagnetic plunger for disengaging said pinch roller from said capstan and switching said selection switch to the fast contact when said selection switch is on its slow contact side and for disabling said fast feed switch and said rewind switch when said selection switch is on its fast contact side.

6. A magnetic recording and reproducing system according to claim 1 further including a selection switch responsive to movement of said pinch roller and containing slow and fast contacts connected, respectively, to slow and fast inputs of said motor for switching said motor between a slow rotation mode and a fast rotation mode in response to the engagement and disengagement of said pinch roller, a counter for counting the number of revolutions of said reel shafts, and a counter switch actuated at a predetermined count of said counter for feeding a voltage to said electromagnetic plunger through a slow contact of said selection switch.

7. A magnetic recording and reproducing system according to claim 1 further including a selection switch responsive to movement of said pinch roller and containing slow and fast contacts which are coupled, respectively, to slow and fast inputs of said motor for switching said motor between a slow rotation mode and a fast rotation mode in response to the engagement and disengagement of said pinch roller, and a forward-reverse switch inserted between a fast contact of said selection switch and said motor.

8. A magnetic recording and reproducing system according to claim 1 wherein said motor is a two-speed motor capable of rotating at high speed and low speeds.

9. A system according to claim 1 further comprising a selection switch responsive to movement of said pinch roller and containing slow and fast contacts coupled, respectively, to slow and fast inputs to said motor means for causing said motor to rotate at a low or high speed in response to the engagement and disengagement of said pinch roller with said capstan, a unidirectional conductive element connecting said slow contact through said operation switch means to said voltage source when a common terminal of said selection switch coupled to said voltage source contacts said fast contact.

10. A magnetic recording and reproducing system according to claim 1 wherein said engagement-disengagement mechanism includes a switch pin for driving said pinch roller into engagement with and disengagement from said capstan, an elevation lever coupled through a hinge to a switch lever to which said switch pin is mounted, a slide lever slidably associated with said switch lever and said elevation lever, said electromagnetic plunger being coupled to said slide lever for imparting a shifting force thereto which lowers said elevation lever to couple a flywheel of said motor to said engagement-disengagement mechanism.

11. A magnetic recording and reproducing system according to claim 10 wherein said engagement-disengagement drive mechanism includes a snap action spring means, the force of which is overcome each time said engagement-disengagement drive mechanism moves said pinch roller either towards or away from said capstan.

12. A magnetic recording and reproducing system according to claim 1 wherein said engagement-disengagement drive mechanism includes a rotary cam plate coupled to said pinch roller for driving said pinch roller into engagement with and disengagement from said capstan, a cutout disc supported by a cam shaft attached to said rotary cam plate, a movable cutout disc swingably mounted to said cam shaft and coupled to said cutout disc through a pressurizing torque spring, a roller connected to said capstan which engages with the periphery of said cutout disc except at the cutout portions for rotating said rotary cam plate, and said electromagnetic plunger has a plunger pawl which engages with and disengages from cutouts of said cutout disc and said movable cutout disc.

13. A magnetic recording and reproducing system according to claim 12 wherein said engagement-disengagement drive mechanism includes a spring for supporting said pinch roller in engagement and disengagement relation to said capstan.

* * * * *